July 9, 1957 A. WILLENBROCK, JR., ET AL 2,798,661
GAS TURBINE POWER PLANT APPARATUS
Filed March 5, 1954 3 Sheets-Sheet 2
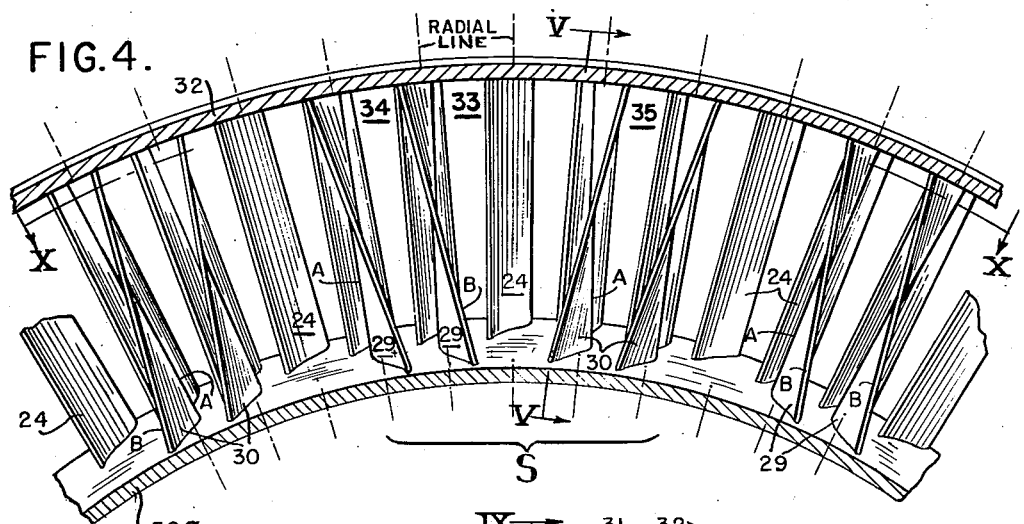
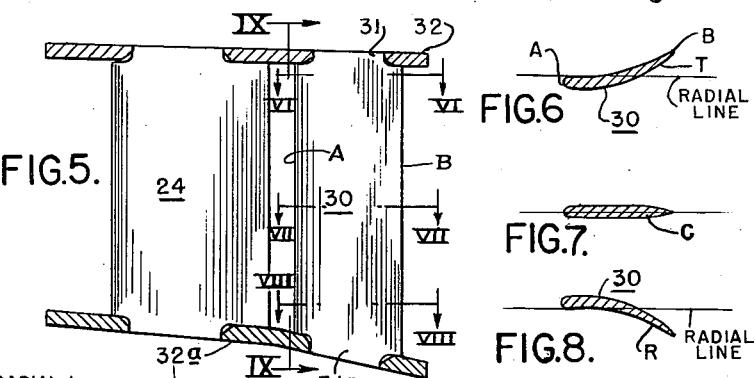
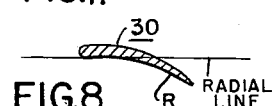
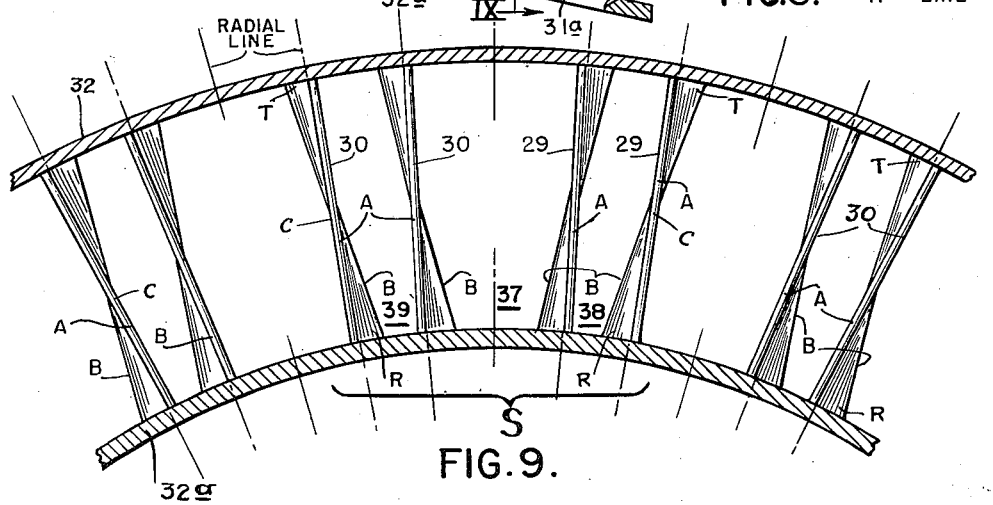
INVENTORS:—
ARTHUR WILLENBROCK JR
ARNOLD H. REDDING
BY
Ralph T. French
ATTORNEY

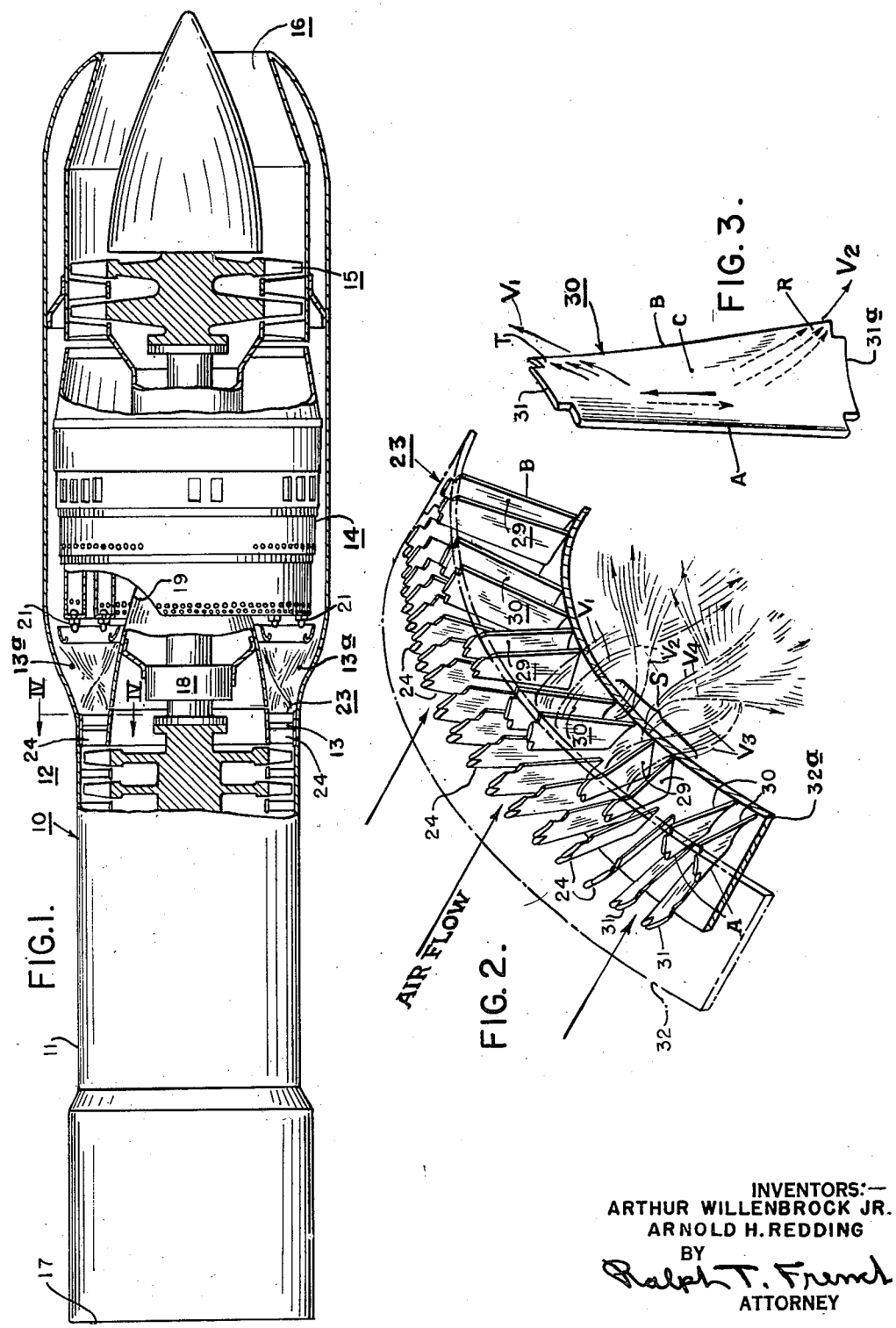

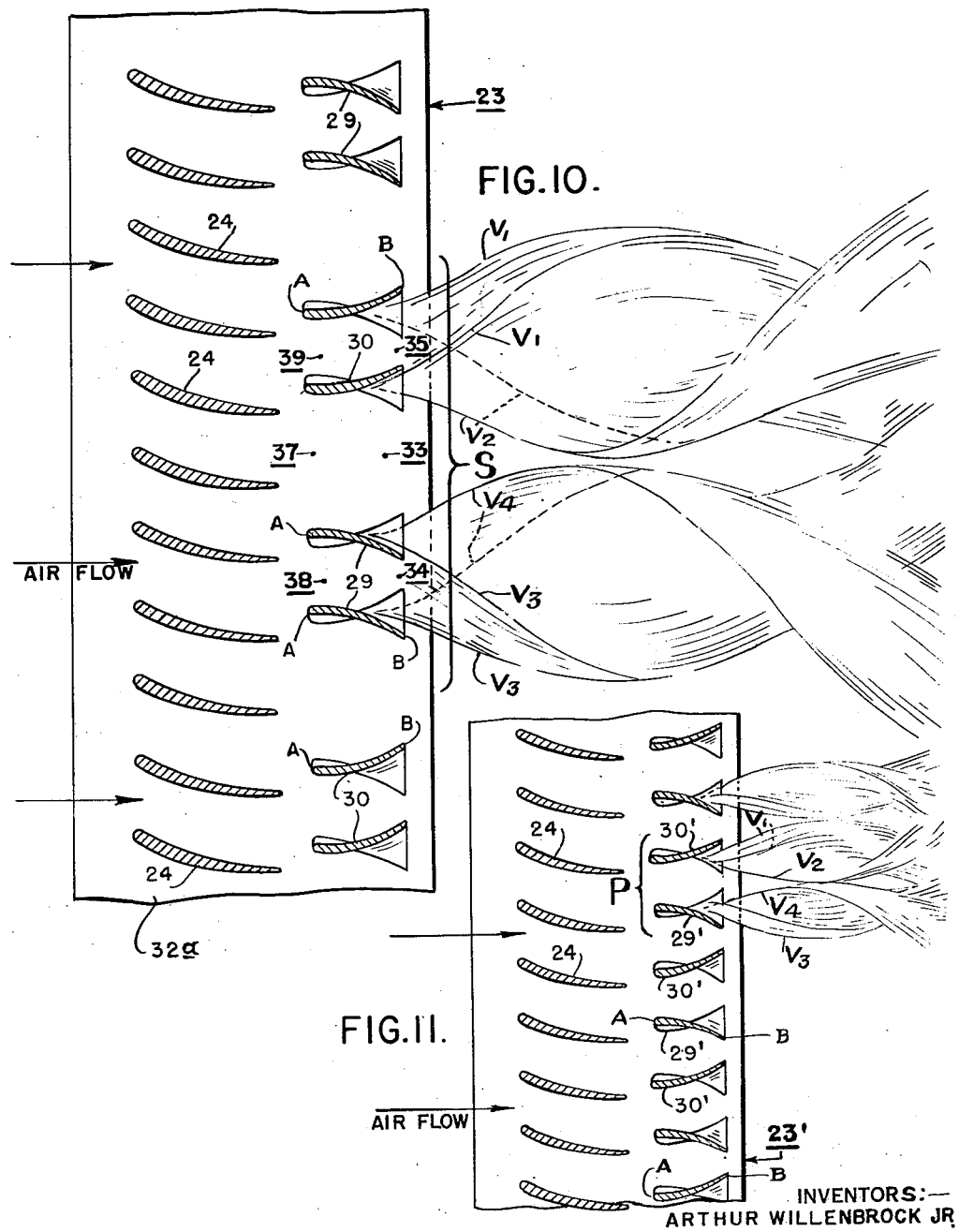

United States Patent Office 2,798,661
Patented July 9, 1957

2,798,661

GAS TURBINE POWER PLANT APPARATUS

Arthur Willenbrock, Jr., Chester, and Arnold H. Redding, Wallingford, Pa., assignors to Westinghouse Electric Corporation, East Pittsburgh, Pa., a corporation of Pennsylvania Application March 5, 1954, Serial No. 414,342

3 Claims. (Cl. 230—122)

This invention relates to fluid pressure apparatus and more particularly to discharge flow distributing means associated with an axial flow compressor.

In Patent No. 2,570,155, issued October 2, 1951 to Arnold H. Redding and assigned to the assignee of the present invention, there is disclosed air mixing structure for an annular passageway into which an axially flowing stream of air is directed from a compressor through radially arranged air guiding or straightening vanes. The annular air mixing structure comprises radially disposed vanes of helical shape arranged in oppositely warped pairs which form radially offset communicating inlet and outlet passages for effecting uniform pressure and velocity distribution of air previously deflected by the guide vanes and entering the mixing structure in axial-flowing concentric courses. While Redding's invention has solved a long existing problem in gas turbines of the above type and is effective in providing considerable uniformity of pressure and velocity to the air thus distributed, it introduces losses which reduce the efficiency of the compressor. It is an object of the present invention to provide an improved mixing structure of the above type in which the efficiency is substantially improved at no additional cost.

It is a further object of the invention to provide an annular air mixing device in which the mixing vanes are arranged in a novel pattern providing substantially complete mixing of the air and minimizing reduction in the kinetic energy of the air.

A more specific object is to provide an air mixing device in which the vanes are shaped in a manner to improve mixing and efficiency characteristics of the device.

These and other objects are effected by the invention as will be apparent from the following description taken in connection with the accompanying drawings, forming a part of this application, in which:

Fig. 1 is a longitudinal view, with parts in section, of an aviation gas turbine power plant having compressor discharge flow apparatus constructed in accordance with the present invention;

Fig. 2 is a fragmentary perspective view of the air mixer, with the casing in phantom;

Fig. 3 is an isometric view, taken on a larger scale showing a mixing vane;

Fig. 4 is an enlarged fragmentary sectional view taken on line IV—IV of Fig. 1;

Fig. 5 is a sectional view taken on line V—V of Fig. 4;

Figs. 6, 7 and 8 are sectional views of a vane taken on lines VI—VI, VII—VII and VIII—VIII, respectively, of Fig. 5;

Fig. 9 is a fragmentary view taken on line IX—IX of Fig. 5;

Fig. 10 is a developed sectional view taken on line X—X of Fig. 4; and

Fig. 11 is a view similar to Fig. 10, but showing another embodiment.

Referring to Fig. 1 of the drawings, a gas turbine power plant or turbojet 10, as therein schematically illustrated, comprises elongated casing structure 11 in which are axially aligned the usual components including an axial-flow compressor 12 adapted to discharge into a passage 13 having an enlarged diffuser portion 13a, annular combustion apparatus 14, a turbine 15 which is adapted to drive the compressor rotor through a common shaft, and an exhaust nozzle 16. The rotor shaft is journaled in suitable bearings including a bearing 18 housed in a fairing 19 that may be supported from the casing structure in any desirable manner. The casing structure and engine components are arranged to provide a generally axial-flow annular passageway, of which the passage 13 forms a part, and which passageway provides continuous communication from a forwardly disposed air inlet opening 17 in the casing structure to the exhaust nozzle 16. Mounted within the passage 13 at the discharge side of the compressor 12 is a stage of radially arranged stationary air guiding or straightening vanes 24, which is disposed somewhat in advance of the diffuser portion 13a.

In operation, air entering the inlet opening 17 is compressed and delivered by the compressor 12 through the straightening vanes 24 in the passage 13 where its vortical or rotary component is removed. The air then flows in axial courses through the diffuser portion 13a to the combustion apparatus 14. Combustion of fuel supplied thereto by way of suitable nozzles 21 creates hot motive fluid which is expanded through the compressor-driving turbine 15, and expelled from the nozzle 16 in the form of a jet to establish a propulsive thrust.

As more fully described in the above-mentioned Redding Patent No. 2,570,155, it is desirable that air under pressure delivered by the compressor be uniformly distributed throughout the flow area of the diffuser portion 13a with a reduction in velocity accompanied by a corresponding increase in pressure.

According to the invention, the desired uniformity of velocity and total pressure distribution throughout the flow area are attained by provision of an improved annular mixer structure 23 comprising a plurality of radially disposed stationary vanes 29 and 30, hereinafter termed mixer vanes each of which may be suitably mounted within the passageway 13 in any desirable manner, for example, as illustrated in Figs. 2 and 3, by fitting terminal tenon portions 31 and 31a into corresponding mortise cavities formed in the respective outer and inner shrouds 32 and 32a. These vanes are preferably disposed intermediate the straightening vanes 24 and the diffuser portion 13a. Each of the vanes 30, as best shown in Fig. 3, is warped to provide twisted surfaces terminating in leading and trailing edges A and B respectively, and are preferably formed of airfoil section as shown in Figs. 5 and 10. Vanes 29 are similar to vanes 30, except that they are twisted in reverse direction.

Referring to Figs. 2 and 4 of the drawing in which the apparatus is viewed in an upstream direction, it will be seen that the mixer vanes 29 and 30 are mounted in sets S of four, that is, two of the mixer vanes 29 are disposed adjacent each other and two of the mixer vanes 30 are disposed adjacent each other and spaced from the mixer vanes 29 in a manner which will be later described in detail.

It will be understood that the mixer vanes 29 and 30 are substantially identical to each other in all aspects except that one is a right-hand member while the other is a left-hand member. That is, they are twisted in opposite directions.

As best shown in Figs. 3, 5 and 8, the vanes 29 and 30 have a root portion R and a tip portion T of equal and opposite curvature or camber and have a central portion C of zero curvature or camber. It will further be noted that the camber at the root and tip R and T, respectively, is of maximum value and diminishes gradually in value in the direction toward the central portion C of the vane. As best shown in Fig. 9, each of the vanes 29 and 30 is disposed with its central axis extending radially and with its leading edge A lying substantially on the radial reference line R and deviating therefrom by the thickness of the leading edge. It will further be noted that the trailing edge B is inclined at a large angle with the longitudinal axis of the vane.

As indicated in Fig. 3 by the solid arrows, boundary layer air flow following the curvature of the vanes is directed from the root portion R upwardly toward the tip portion T while on the opposite side the boundary layer air flow, indicated by the dotted arrows, moves downwardly from the tip portion T of the vane toward the root portion R. Due to the curvature of the vane and also due to the axial velocity component of the air, these boundary layer flows move diagonally across the vane in a downstream direction. As the boundary layer air is shed by the trailing edge B, the two streams, that is, the streams shown in dotted arrows and solid arrows, follow force lines $V_2$ and $V_1$, respectively, and combine to impart a vortical or spiral movement to the air stream.

As best shown in Fig. 4, which is a view looking upstream of the mixer structure 23, each set of vanes S preferably comprises two pairs of mixer vanes 29 and 30, formed by a first pair of vanes disposed adjacent each other and flanked by a second pair of vanes thereby forming air exits 33, 34 and 35 defined by the trailing edges B of the vanes. The exit 33 is convergent in radially inward direction, while the exits 34 and 35 are generally of uniform width throughout and inclined toward each other in radially inward direction.

Referring to Fig. 9, in which the mixer structure 23 is viewed in downstream direction, it will be noted that the leading edges A of the vanes 29 and 30 are generally radially disposed, as indicated by the radial reference lines R, and define entrance passages 37, 38 and 39. The entrance passages 37, 38 and 39 diverge only slightly in outwardly radial direction and are of approximately uniform width throughout.

The inner pair of vanes in each set are preferably spaced further apart from each other than from the adjacent outer pair of vanes. This spacing is not critical and may be varied as desired. However, a spacing ratio of 2:1 has been found highly satisfactory. With this arrangement the air passageway formed by the inner pair of vanes is considerably larger than the passageways formed by the flanking second pair of vanes.

*Operation*

In operation, air delivered by the compressor 12 through the straightening vanes 24, as best shown in Figs. 2 and 10, has its vortical component removed and enters the mixer 23 in substantially axial courses. Conditions will now be considered for only one set S of four mixer vanes 29 and 30, it being understood that the same conditions will prevail for the other similar sets in the mixer structure. As the air enters the entrance 39, that portion of the air flowing against the oppositely facing surfaces of the vanes 30 will have imparted thereon rotational forces causing it to spiral downstream and follow the force lines $V_1$ and $V_2$. That portion of the air entering the entrance 37 is affected by the oppositely disposed faces of the vanes 30 and 29, imparting a spin to the air generally indicated by the force lines $V_2$ and $V_3$, respectively. In addition to the above, that portion of the air entering the entrance 38 is affected by the oppositely disposed faces of the vanes 29, so that the air stream shedding from the trailing edges of the vanes 29 follows force lines $V_4$ and $V_3$. The forces imparted to the air by the adjacent vanes 29 cause the air to spiral in a rapidly widening vortex, which at first is substantially distinct from the air vortex formed by the adjacent vanes 30.

However, the vortex is of brief duration and after a downstream travel equal to several chord lengths of the vanes 29 and 30, in which time the air vortices rotate through 180° in opposite rotational direction, the rotary forces are dissipated sufficiently by co-mingling of the vortices with each other that the air flow downstream thereof in the diffuser portion 13a adjacent the combustion chambers 14 is generally axial.

Further analyzing the force lines $V_1$ and $V_2$ of the air streams flowing past vanes 30, as best shown in Figs. 2 and 3, it will be seen that $V_1$ contains boundary layer air taken from the root portions R, which boundary air is traveling at low velocity, and diverts this air outwardly into the stream of fast moving air adjacent the vane tips T where its velocity is increased. On the other hand, the force lines $V_2$ originate at the tip portions T of the vanes where the velocity of the air is relatively high and directs it inwardly into the slower moving air stream at the root portions of the vanes, thereby imparting additional kinetic energy thereto.

The vanes 29 operate in a similar manner as previously described, except that the force lines $V_3$, $V_4$ produce oppositely rotating vortices.

It will now be seen that, with the above invention, the air delivered to the combustion chambers attains a uniform velocity in the downstream region of the diffuser portion 13a and that although the air leaving the mixer structure 23 is originally flowing in a plurality of vortices alternately rotating in different directions, these vortical flows serve to mix the air streams to provide uniform pressure and velocity therein and are dissipated after a flow length equal to several chord lengths of the mixer vanes. It has been established by tests that the vortical forces are dissipated within a distance of approximately four chord lengths of the vanes. In view of the above, for optimum results, the axial length of the diffuser passage portion 13a is preferably at least equal to four chord lengths of the vanes.

It must further be understood that although in the above embodiment the vanes have been arranged in sets of two pairs (four vanes), other arrangements may also be provided. For example, it is entirely feasible that sets of three pairs or even four pairs may be utilized entirely within the scope of invention.

On the other hand, the vane configuration previously described in connection with the first embodiment may also be utilized in the embodiment shown in Fig. 11 in which an annular air mixing structure 23' is similar in all aspects to the mixer structure 23, shown in the first embodiment, with the exception that the set of vanes P comprise one pair of mixer vanes 29' and 30' arranged in oppositely warped pairs disposed adjacent each other. The vanes 29' and 30' are the same configuration as the vanes 29 and 30, respectively, previously described. In this embodiment, the vanes 29' and 30' of each of the sets P are preferably equally spaced from each other.

The force lines $V_1$ and $V_2$ of the air stream flowing past the vane 30' are similar to the force lines $V_1$ and $V_2$ previously described, and the force lines $V_3$ and $V_4$ imparted to the air streams flowing past the vane 29' are similar to the force lines $V_3$ and $V_4$ of vane 29 previously described. With this arrangement, the air flowing through the mixer 23' is spiraled into a larger number of vortices. It will be noted that the vortices are of smaller convolution than those of the first embodiment, since each vane forms a single vortex whereas in the first embodiment two adjacent vanes of the same type unite to form a larger vortex. The vortices formed by the vanes 29' and 30' alternately revolve in opposite directions and after a short travel downstream from the vanes dissipate their rotational energy, whereby the air after a short travel downstream flows in generally axial courses in which the pressure and velocity of the air is substantially uniform.

While the invention has been shown in several forms, it will be obvious to those skilled in the art that it is not so limited, but is susceptible of various other changes and modifications without departing from the spirit thereof.

What is claimed is:

1. In a cylindrical casing structure having an annular passageway, means for supplying fluid under pressure thereto and stationary flow control means interposed in said passageway comprising a plurality of sets of radially disposed vanes curved to provide surfaces for guiding currents of fluid uniformly throughout the flow area of said passageway, each of said sets including a first pair of vanes and a second pair of vanes, said first and second pairs of vanes including two left-hand warped vanes and two right-hand warped vanes, said left-hand vanes being disposed adjacent each other and said right-hand vanes being disposed adjacent each other.

2. The structure recited in claim 1 in which each of said vanes has a root portion, a tip portion and a central portion, said root and tip portions having a curvature of substantially equal but opposite camber, the camber at said root and tip portions being of maximum value and gradually diminishing in value in a direction toward said central portion.

3. In a cylindrical casing structure having an annular passageway, means for supplying fluid under pressure thereto and stationary flow control means interposed in said passageway comprising a plurality of sets of vanes having their central axes extending in substantially radial direction and being curved to provide surfaces for guiding currents of fluid uniformly throughout the flow area of said passageway, each of said sets including a first pair of vanes and a second pair of vanes, including two left-hand warped vanes and two right-hand warped vanes, said left-hand vanes being disposed adjacent each other and said right-hand vanes being disposed adjacent each other, each of said vanes having a leading edge and a trailing edge coacting to define a plurality of entrances and exits, respectively, for said passage, said trailing edge being disposed at a substantial angle to the central axis of said vane, the trailing edges of each pair of vanes converging at an angle in inwardly radial direction, the trailing edges of said second pair of vanes coacting with each other to define a radially inwardly converging exit, and the trailing edges of said first pair of vanes coacting with the trailing edges of said second pair of vanes to define exits of substantially uniform breadth.

References Cited in the file of this patent

UNITED STATES PATENTS

| | | |
|---|---|---|
| 2,558,816 | Bruynes | July 3, 1951 |
| 2,570,155 | Redding | Oct. 2, 1951 |

FOREIGN PATENTS

| | | |
|---|---|---|
| 26,979 | Great Britain | of 1903 |
| 337,422 | France | Apr. 9, 1904 |